United States Patent
Chen et al.

(10) Patent No.: US 12,456,861 B2
(45) Date of Patent: Oct. 28, 2025

(54) POWER SUPPLY METHOD AND APPARATUS, ELECTRONIC DEVICE, AND READABLE STORAGE MEDIUM

(71) Applicant: Huawei Digital Power Technologies Co., Ltd., Shenzhen (CN)

(72) Inventors: Baoguo Chen, Dongguan (CN); Pan Chen, Dongguan (CN); Hua Yu, Dongguan (CN); Liqiong Yi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 18/180,844

(22) Filed: Mar. 8, 2023

(65) Prior Publication Data

US 2023/0223753 A1 Jul. 13, 2023

Related U.S. Application Data

(63) Continuation of application No. PCT/CN2020/114533, filed on Sep. 10, 2020.

(51) Int. Cl.
*H02J 3/00* (2006.01)

(52) U.S. Cl.
CPC ....... *H02J 3/00125* (2020.01); *H02J 2310/52* (2020.01)

(58) Field of Classification Search
CPC .................. H02J 2310/52; H02J 3/00125
See application file for complete search history.

(56) References Cited

U.S. PATENT DOCUMENTS

| | | | |
|---|---|---|---|
| 2010/0142237 A1 | 6/2010 | Yuan et al. | |
| 2017/0314534 A1* | 11/2017 | Gupta | H02J 3/381 |

FOREIGN PATENT DOCUMENTS

| | | | | |
|---|---|---|---|---|
| CN | 202206125 U | * | 4/2012 | |
| CN | 107562166 A | | 1/2018 | |
| CN | 108631590 A | | 10/2018 | |
| CN | 109861262 A | * | 6/2019 | |
| CN | 110763911 A | * | 2/2020 | ........... G01R 21/002 |
| CN | 111049175 A | * | 4/2020 | ................ H02J 3/36 |
| WO | 03028187 A1 | | 4/2003 | |

* cited by examiner

*Primary Examiner* — Harry R Behm

(57) ABSTRACT

Embodiments of this application provide a power supply method and apparatus, an electronic device, and a readable storage medium. The method includes: determining whether a current power grid is a weak power grid; if the current power grid is a weak power grid, determining a target current limit value based on an actual input voltage of a power system; and supplying power to a load based on the target current limit value. The power system may adaptively adjust a current limit value of the power system based on an input voltage, so as to supply power to the load while avoiding undervoltage in the power system.

18 Claims, 9 Drawing Sheets

POWER SUPPLY METHOD AND APPARATUS, ELECTRONIC DEVICE, AND READABLE STORAGE MEDIUM

CROSS-REFERENCE TO RELATED APPLICATIONS

This application is a continuation of International Application No. PCT/CN2020/114533, filed on Sep. 10, 2020, the disclosure of which is hereby incorporated by reference in its entirety.

TECHNICAL FIELD

This application relates to the field of communication technologies, and in particular, to a power supply method and apparatus, an electronic device, and a readable storage medium

BACKGROUND

A power system is an important part of a communication system, and is used to supply power in a power grid to a load. Some power systems may be deployed in scenarios such as a mountain area and a high-speed road, to supply power to a load, for example, a remote radio unit (RRU) disposed in these scenarios. In these scenarios, a distance between the power system and a power transformer may be long. When the distance between the power system and the power transformer is long, impedance of a power transmission cable between the power transformer and the power system is abnormally high. Correspondingly, the power transmission cable encounters an excessively large voltage drop, which may cause input undervoltage and repeated restart of the power system, and further cause the RRU and another load to malfunction.

In a conventional technology, after repeated restart occurs in the power system due to the input undervoltage, an engineer usually manually modifies a current limit value of the power system on a site of the power system, so that an input voltage does not fall below an undervoltage point of the power system, to further avoid repeated restart of the power system.

However, the manner in the conventional technology forcibly limits a power supply capability of the power system. When a load is heavy, a power failure of the load may occur due to insufficient power supply.

SUMMARY

Embodiments of this application provide a power supply method and apparatus, an electronic device, and a readable storage medium, so that a power system may adaptively adjust a current limit value of the power system based on an input voltage, so as to supply power to a load while avoiding undervoltage in the power system.

According to a first aspect, an embodiment of this application provides a power supply method. The method may be applied to a power system, a chip in the power system, a rectifier in the power system, or a chip in the rectifier. The following describes the method by using application to the rectifier as an example. In the method, the power system supplies power to a load by using an external power grid. The rectifier may determine whether a current power grid is a weak power grid; if the current power grid is a weak power grid, determine a target current limit value based on an actual input voltage of the power system; and supply power to the load based on the target current limit value.

If the current power grid is a weak power grid, input undervoltage may be caused to the power system. The power system performs self-protection when input undervoltage occurs in the power system. As a result, components (the rectifier, a monitoring apparatus, and the like) in the power system repeatedly restart. In this embodiment of this application, when the current power grid is a weak power grid, the rectifier may adaptively adjust a current limit value of the power system based on an input voltage, so as to supply power to the load while avoiding undervoltage in the power system. When the power grid is normal, for example, a high input voltage is provided to the power system, the current limit value of the power system may be adjusted to a value commonly used by the power system, so that the power system can charge the load and a battery in the power system. When the power grid is a weak power grid, for example, the input voltage of the power system is low, the current limit value of the power system may be adjusted to a small value, so that the power system can output a weak output current, thereby ensuring that power is supplied to the load while undervoltage is avoided in the power system.

In an embodiment, a method in which the rectifier determines whether the current power grid is a weak power grid may be: if a quantity of times that the power system is in an undervoltage state within a preset time period is greater than or equal to a preset quantity of times, determining that the current power grid is a weak power grid. Because the power grid outputs varying voltages, a bus voltage of the power system and the actual input voltage of the power system may change. Therefore, in this embodiment of this application, if the power system is in the undervoltage state at a time, it may be inaccurate to determine that the current power grid is a weak power grid. Therefore, in this embodiment of this application, to improve accuracy of determining whether the current power grid is a weak power grid by using the rectifier, the quantity of times that the power system is in the undervoltage state within the preset time period is used to determine whether the current power grid is a weak power grid.

The rectifier may determine, based on at least one of the bus voltage and the actual input voltage that are of the power system, whether the power system is in the undervoltage state. Optionally, if the bus voltage is less than or equal to a first undervoltage threshold, and/or the actual input voltage is less than or equal to a second undervoltage threshold, it is determined that the power system is in the undervoltage state.

If the current power grid is a weak power grid, the rectifier may determine the target current limit value based on the actual input voltage of the power system. A process may be: adjusting the current limit value of the power system to a first current limit value; obtaining a sum of the first current limit value and a preset current limit adjustment value, and using the sum of the first current limit value and the preset current limit adjustment value as a second current limit value; and determining the target current limit value based on an actual input voltage existing when the power system works at the second current limit value. The first current limit value may be predefined, and is a minimum current limit value supported by the power system. The preset current limit adjustment value may be preset in this embodiment of this application. The preset current limit adjustment value is a value by which the rectifier increases or decreases the current limit value based on an adjusted current limit value of the power system. After adjusting the first current limit value to the second current limit value, the rectifier may determine, based on the actual input voltage of the power system, whether to re-adjust the second current limit value of the power system. If the actual input voltage existing when the power system works at the second current limit value is greater than a first voltage threshold, the rectifier may determine that the second current limit value is small, and may increase the second current limit value. It should be understood that the first voltage threshold may be an upper limit (or an upper boundary) of a preset range of the actual input voltage. In this embodiment of this application, the rectifier may determine a sum of the second current limit value and the preset current limit adjustment value, and use the sum of the second current limit value and the preset current limit adjustment value as a third current limit value, so as to adjust the current limit value of the power system to the third current limit value.

If the actual input voltage existing when the power system works at the second current limit value is less than a second voltage threshold, a difference between the second current limit value and the preset current limit adjustment value is determined, and the difference between the second current limit value and the preset current limit adjustment value is used as the third current limit value, where the second voltage threshold is less than the first voltage threshold. If the actual input voltage existing when the power system works at the second current limit value or an actual input voltage existing when the power system works at the third current limit value is greater than or equal to the second voltage threshold, and is less than or equal to the first voltage threshold, the second current limit value or the third current limit value is used as the target current limit value.

In other words, in this embodiment of this application, the rectifier may determine, in an iterative manner, the target current limit value based on the actual input voltage existing when the power system works at the second current limit value. The steps may be as follows.

A. If an actual input voltage of the power system in an iteration period t is greater than or equal to the second voltage threshold, and the actual input voltage in the iteration period t is less than or equal to the first voltage threshold, using a current limit value in the iteration period t as the target current limit value; or otherwise, performing B or C, where the first voltage threshold is greater than the second voltage threshold, when t is equal to 1, the actual input voltage in the iteration period t is the first actual input voltage, and t is an integer greater than or equal to 1; and B. If the actual input voltage in the iteration period t is greater than the first voltage threshold, obtaining a sum of the current limit value in the iteration period t and the preset current limit adjustment value, and using the sum of the current limit value in the iteration period t and the preset current limit adjustment value as a current limit value in a next iteration period; or C. If the actual input voltage in the iteration period t is less than the second voltage threshold, obtaining a difference between the current limit value in the iteration period t and the preset current limit adjustment value, and using the difference between the current limit value in the iteration period t and the preset current limit adjustment value as a current limit value in a next iteration period; and D. Obtaining an actual input voltage existing when the power system works at the current limit value in the next iteration period, entering the next iteration period, and returning to A.

In this embodiment of this application, the rectifier may dynamically adjust the current limit value of the power system based on the actual input voltage, so as to adjust the current limit value to the target current limit value. This method is more applicable to an actual application scenario. With this method, the load is sufficiently charged based on a real-time actual input voltage, thereby maximizing a capability of utilizing the power grid and improving charging efficiency.

In an embodiment, the power system may include a battery. In this scenario, when an input voltage is very low, a range of the current limit value that can be adjusted by the power system is limited. Therefore, in this embodiment of this application, to ensure accuracy of adjusting the current limit value by the power system, when the actual input voltage is within a proper voltage range, the rectifier can increase or decrease the current limit value of the power system without causing undervoltage in the power system, and can further adjust the current limit value of the power system to the target current limit value. This method can improve stability of the power system and stability of the power supply method. Therefore, in this embodiment of this application, before the target current limit value is determined based on the actual input voltage of the power system, it may be further determined whether the power system includes an energy storage module, and whether the actual input voltage of the power system is greater than or equal to a third voltage threshold. If the power system includes the energy storage module, and the actual input voltage is greater than or equal to the third voltage threshold, the current limit value of the power system is adjusted based on the actual input voltage, to obtain the target current limit value. It should be understood that the energy storage module may be a battery.

In an embodiment, if determining that the current power grid is a weak power grid, the rectifier may output alarm information. The alarm information indicates that the current power grid is a weak power grid.

In addition, in this embodiment of this application, if the current power grid is not a weak power grid, the rectifier may adjust the current limit value of the power system to an initial current limit value. For example, if an actual output current is less than the target current limit value, the current limit value of the power system is adjusted to the initial current limit value. Alternatively, if the actual input voltage is greater than or equal to a preset voltage, the current limit value of the power system is adjusted to the initial current limit value. When the current power grid is not a weak power grid, the rectifier may adjust the current limit value of the power system, so that the power system can charge the load at a maximum charging voltage, thereby improving intelligence of the power system.

According to a second aspect, an embodiment of this application provides a power supply apparatus, disposed in a power system. The power system supplies power to a load by using an external power grid. The power supply apparatus includes a processing module and a power supply module.

The processing module is configured to: determine whether a current power grid is a weak power grid, and if the current power grid is a weak power grid, determine a target current limit value based on an actual input voltage of the power system.

The power supply module is configured to supply power to the load based on the target current limit value.

In an embodiment, the processing module is configured to: if a quantity of times that the power system is in an undervoltage state within a preset time period is greater than or equal to a preset quantity of times, determine that the current power grid is a weak power grid.

In an embodiment, the processing module is further configured to determine, based on at least one of a bus voltage and the actual input voltage that are of the power system, whether the power system is in the undervoltage state.

In an embodiment, the processing module is configured to: if the bus voltage is less than or equal to a first undervoltage threshold, and/or the actual input voltage is less than or equal to a second undervoltage threshold, determine that the power system is in the undervoltage state.

In an embodiment, the processing module is configured to: adjust a current limit value of the power system to a first current limit value; obtain a sum of the first current limit value and a preset current limit adjustment value, and use the sum of the first current limit value and the preset current limit adjustment value as a second current limit value; and determine the target current limit value based on a first actual input voltage existing when the power system works at the second current limit value.

In an embodiment, the processing module is configured to perform the following steps.

A. if an actual input voltage of the power system in an iteration period t is greater than or equal to a second voltage threshold, and the actual input voltage in the iteration period t is less than or equal to a first voltage threshold, using a current limit value in the iteration period t as the target current limit value; or otherwise, performing B or C, where the first voltage threshold is greater than the second voltage threshold, when t is equal to 1, the actual input voltage in the iteration period t is the first actual input voltage, and t is an integer greater than or equal to 1; and B. if the actual input voltage in the iteration period t is greater than the first voltage threshold, obtaining a sum of the current limit value in the iteration period t and the preset current limit adjustment value, and using the sum of the current limit value in the iteration period t and the preset current limit adjustment value as a current limit value in a next iteration period; or C. if the actual input voltage in the iteration period t is less than the second voltage threshold, obtaining a difference between the current limit value in the iteration period t and the preset current limit adjustment value, and using the difference between the current limit value in the iteration period t and the preset current limit adjustment value as a current limit value in a next iteration period;

and

D. obtaining an actual input voltage existing when the power system works at the current limit value in the next iteration period, entering the next iteration period, and returning to A.

In an embodiment, the processing module is further configured to: if an actual output current of the power system is less than the target current limit value, adjust the current limit value of the power system to an initial current limit value.

In an embodiment, the processing module is further configured to: if the actual input voltage is greater than or equal to the second undervoltage threshold, adjust the current limit value of the power system to an initial current limit value.

In an embodiment, the processing module is configured to: determine whether the power system includes an energy storage module, and whether the actual input voltage of the power system is greater than or equal to a third voltage threshold; and if the power system includes the energy storage module, and the actual input voltage of the power system is greater than or equal to the third voltage threshold, determine the target current limit value based on the actual input voltage of the power system.

In an embodiment, the processing module is further configured to: if the current power grid is a weak power grid, output alarm information, where the alarm information indicates that the current power grid is a weak power grid.

According to a third aspect, an embodiment of this application provides a power supply apparatus. The power supply apparatus includes a processor and a memory. The memory is configured to store computer executable program code, and the program code includes instructions. When the processor executes the instructions, the instructions enable the power supply apparatus to execute the method according to each of the first aspect or the designs of the first aspect.

According to a fourth aspect, an embodiment of this application provides a power supply apparatus, including a unit, a module, or a circuit that is configured to execute the method according to each of the first aspect or the designs of the first aspect. The power supply apparatus may be a rectifier, or may be a module applied to the rectifier, for example, may be a chip applied to the rectifier.

According to a fifth aspect, an embodiment of this application provides a power supply apparatus (for example, a chip). The power supply apparatus stores a computer program. When the computer program is executed by the power supply apparatus, the method according to each of the first aspect or the designs of the first aspect is implemented.

According to a sixth aspect, an embodiment of this application provides a computer program product including instructions. When the computer program product runs on a computer, the computer is enabled to perform the method in the first aspect or the designs of the first aspect.

According to a seventh aspect, an embodiment of this application provides a computer-readable storage medium. The computer-readable storage medium stores instructions, and when the instructions are run on a computer, the computer is enabled to perform the method in the first aspect or the designs of the first aspect.

According to an eighth aspect, an embodiment of this application provides a power system, including the power supply apparatus according to each of the second aspect or the designs thereof and a monitoring apparatus. The monitoring apparatus is configured to monitor the power supply apparatus.

According to a ninth aspect, an embodiment of this application provides a power supply system, including the power system according to the eighth aspect, a power grid, and a power transformer. The power grid supplies power to the power system by using the power transformer.

It should be understood that for implementation principles and technical effects of the third aspect to the ninth aspect in embodiments of this application, refer to the first aspect. Details are not described herein.

DESCRIPTION OF EMBODIMENTS

Figure 1:
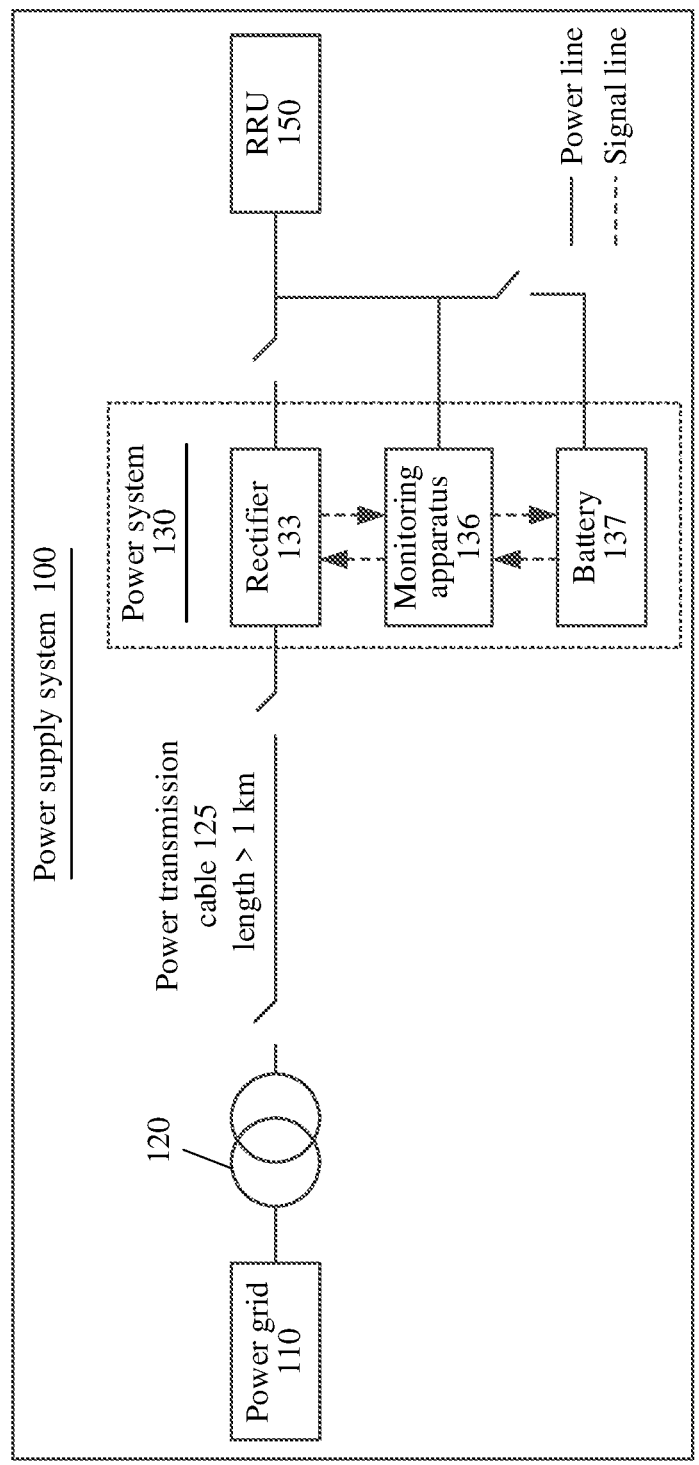
FIG. 1 is a diagram of a power supply system to which a power supply method is applicable according to an embodiment of this application.

FIG. 1 is a diagram of a power supply system 100 to which a power supply method is applicable according to an embodiment of this application. As shown in FIG. 1, the scenario may include a power grid 110, a power transformer 120, a power system 130, and a load. The power transformer 120 may perform transformation on a voltage output by the power grid 110, and transmit a voltage obtained after the transformation to the power system 130 through a power transmission cable 125, so that the power system 130 supplies power to the load. The power system 130 may include a rectifier 133 and a battery 137. The rectifier 133 may convert an alternating current from the power grid 110 into a direct current, and output the direct current to the load, so as to supply power to the load. The rectifier 133 may also output the direct current obtained by the conversion to the battery 137, to charge the battery 137. The battery 137 may store electric energy in a charging state, so that the battery 137 discharges to supply power to the load when a power failure of the power system 130 occurs or a voltage of the power system 130 is insufficient. In this embodiment of this application, the load may be but is not limited to a remote radio unit (RRU) 150, and the load may further include a building baseband unit (BBU). It should be understood that the power supply scenario shown in FIG. 1 may further include another device. For example, the power system 130 may further include a monitoring apparatus 136. This is not limited in this embodiment of this application. The power supply method in this embodiment of this application is also applicable to a power system 130 that does not include a battery 137. That the power system 130 includes a battery 137 is used as an example for description in FIG. 1.

However, when the power system 130 is deployed in scenarios such as a mountain area and a high-speed road, a distance between the power system 130 and the power transformer 120 may be long. As shown in FIG. 1, the distance between the power system 130 and the power transformer 120 is greater than 1 km. When the distance between the power system 130 and the power transformer 120 is long, impedance of the power transmission cable 125 between the power transformer 120 and the power system 130 is abnormally high. Correspondingly, the power transmission cable 125 between the power transformer 120 and the power system 130 encounters an excessively large voltage drop, which may cause input undervoltage in the power system 130. The undervoltage may be understood as that an input voltage of the power system 130 is excessively low, and does not meet a minimum requirement of normal working of the power system 130. The power system 130 performs self-protection when input undervoltage occurs in the power system 130. As a result, components (the rectifier 133, the monitoring apparatus 136, and the like) in the power system 130 repeatedly restart, and further cause the RRU 150 and another load to malfunction.

Figure 2:
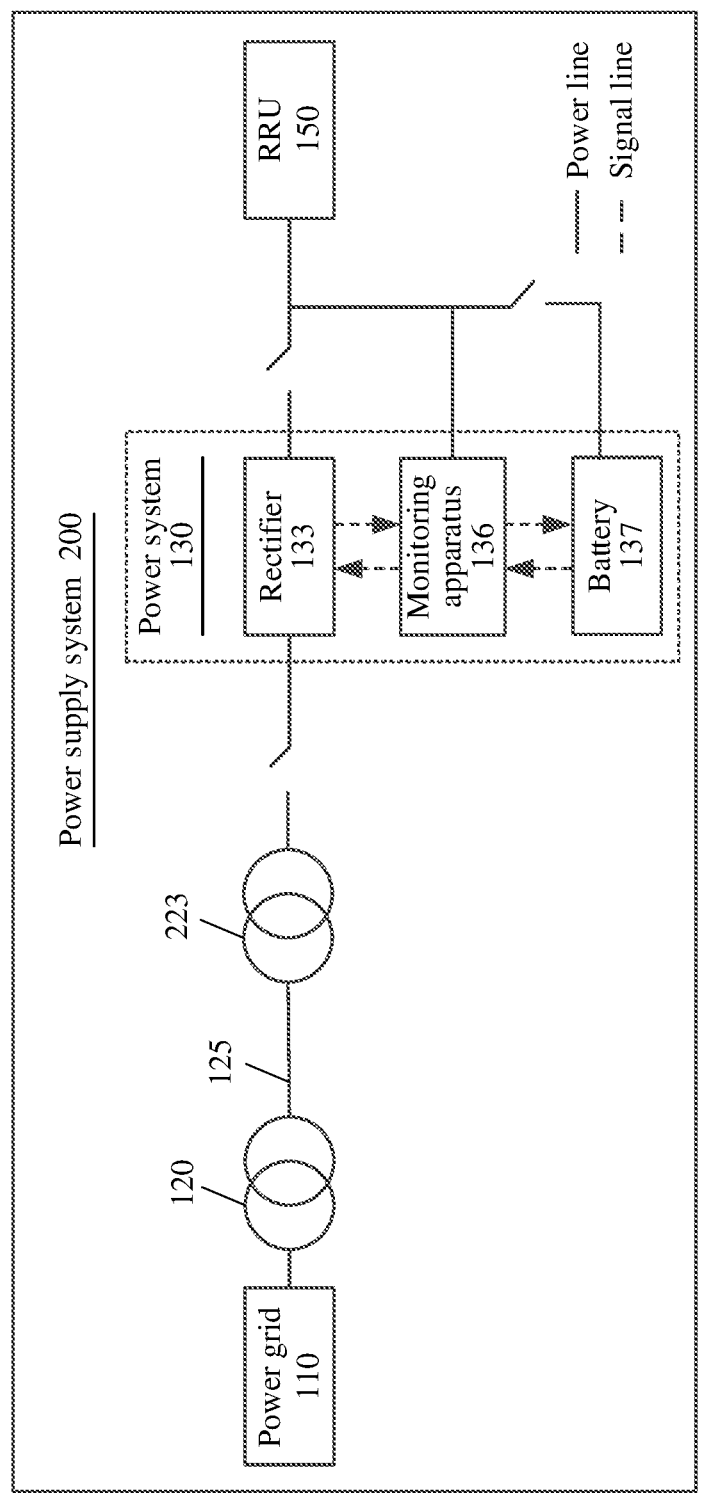
FIG. 2 is a diagram of a power supply system according to another embodiment.

FIG. 2 is a diagram of a power supply system 200 according to another embodiment of the application. As shown in FIG. 2, to resolve the foregoing problem, an additional power transformer 123 may be disposed between the power system 130 and the power transformer 120, so as to shorten a length of the power transmission cable 125 between the power system 130 and the additional power transformer 123. This reduces the impedance of the power transmission cable 125 between the power transformer 120 and the power system 130, so as to avoid input undervoltage in the power system 130. For example, one additional power transformer 123 is disposed between the power system 130 and the power transformer 120 every 500 m. However, this method needs high costs. Further, if the foregoing problem mostly occurs in the scenario of a mountain area, the power transformer is large in volume and heavy in weight, causing enormous installation difficulty.

To avoid an additional device, currently, a technical solution is further provided, in which an engineer manually modifies a current limit value of the power system 130 on a site of the power system 130. The current limit value refers to a maximum current that can be output by the power system 130. For example, an engineer usually adjusts, based on experience, the current limit value of the power system 130 to a current limit value that can meet normal working of a load. For example, the current limit value may represent a current required for normal working of one RRU 150, and the RUU 150 is a main load. Correspondingly, because an output current (that is, the current limit value) is limited in the power system 130, an output power is limited, and an input power is also indirectly limited. When an input power existing after a current value of the power system 130 is limited to be less than a power that can be provided by the power grid 110, the input voltage of the power system 130 is not pulled down below an undervoltage protection point of the power system 130. Therefore, the power system 130 can work normally, and input undervoltage is avoided in the power system 130. However, in this technical solution, an engineer needs to manually adjust the current limit value on site (that is, on a site on which the power system 130 is located). Costs of on-site manual adjustment are very high, and a modified current limit value cannot be changed. Even if the power grid 110 is restored to normal, an initial current limit value cannot be automatically restored. This is equivalent to forcibly limiting a power supply capability of the power system 130 and supplying power only to the main load. When a load is heavy, the load may encounter a power failure due to insufficient power supply. For example, if 12 RUUs need to be powered at present, but a current output by the power system 130 is insufficient to supply power to these loads, the battery 137 in the power system 130 may discharge, causing a power failure. In addition, if the battery 137 is in an over-discharge state for a long time, the battery 137 is scrapped.

To resolve the foregoing problem, an embodiment of this application provides a power supply method, so that the power system 130 may adaptively adjust the current limit value of the power system 130 based on the input voltage, so as to supply power to the load while avoiding undervoltage in the power system 130. For example, when the power grid 110 is normal, for example, when a high input voltage is provided to the power system 130, the current limit value of the power system 130 may be adjusted to a value commonly used by the power system 130, so that the power system 130 can charge the load and the battery 137 in the power system 130. When the power grid 110 is a weak power grid, for example, the input voltage of the power system 130 is low, the current limit value of the power system 130 may be adjusted to a small value, so that the power system 130 can output a weak output current, thereby ensuring that power is supplied to the load while undervoltage is avoided in the power system 130. In addition, in the power supply method provided in this embodiment of this application, a hardware structure of the power system 130 is not changed and the power system 130 may automatically adjust the current limit value of the power system 130 based on the input voltage. This improves intelligence of the power system 130 and ensures a service life of the battery 137. In addition, in the power supply method, there is no manual participation in an entire process, thereby reducing difficulty and costs of operation and maintenance.

It should be understood that in addition to the foregoing power supply scenario shown in FIG. 1, the method provided in this embodiment of this application may also be applicable to a scenario in which an input voltage of a power system is low. This is not limited in this embodiment of this application. It should be understood that, in this embodiment of this application, the following power supply method may be performed by a power supply apparatus. The power supply apparatus may be a power system, or a chip in the power system, or a rectifier or another module included in the current power system, or a chip in the rectifier or the another module included in the current power system. In the following embodiments, that the power supply apparatus is a rectifier is used as an example for description.

Figure 3:
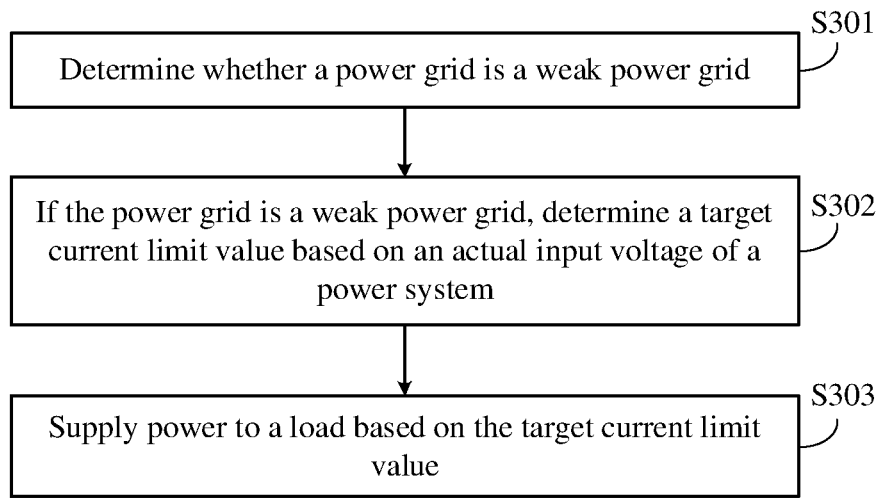
FIG. 3 is a flowchart of a power supply method according to an embodiment of this application.

The following describes in detail the power supply method in this embodiment of this application with reference to various embodiments. The following embodiments may be combined with each other, and a same or similar concept or process may not be described repeatedly in some embodiments. FIG. 3 is a flowchart of a power supply method according to an embodiment of this application. As shown in FIG. 3, the power supply method provided in this embodiment of this application may include:

S301: Determine whether a current power grid is a weak power grid.

S302: If the current power grid is a weak power grid, determine a target current limit value based on an actual input voltage of a power system.

S303: Supply power to a load based on the target current limit value.

In S301, the power grid outputs varying voltages due to various external factors. An influencing factor may be device or line switching in the power grid, device aging in the power grid, or the like. That the power grid is a weak power grid may be understood as that a voltage output by the power grid is less than a voltage threshold. It should be understood that a rectifier may determine whether the current power grid is a weak power grid. In this embodiment of this application, an implementation in which the rectifier determines whether the current power grid is a weak power grid is as follows: For example, the power grid may include a communication module, the power system may include a communication module, and the rectifier may be connected to the communication module in the power system. When the voltage output by the power grid is less than the voltage threshold, the power grid may interact with the communication module in the power system by using the communication module in the power grid, so as to notify the rectifier that the current power grid is a weak power grid. For example, when the voltage output by the power grid is less than a first voltage threshold, the power grid may send a weak power grid message to the communication module in the power system by using the communication module in the power grid. The weak power grid message indicates that the current power grid is a weak power grid. After receiving the message, the communication module in the power system may synchronize the message to the rectifier.

Alternatively, another implementation in which the rectifier determines whether the power grid is a weak power grid is as follows: When determining that the power system is in an undervoltage state, the rectifier may determine that the current power grid is a weak power grid. In this manner, the rectifier may determine, based on at least one of a bus voltage and the actual input voltage of the power system, whether the power system is in the undervoltage state. The bus voltage of the power system may be a voltage of a power factor correction (PFC) bus inside the rectifier. The actual input voltage of the power system may be an input voltage of the power system. It should be understood that the power system may include a monitoring apparatus. The monitoring apparatus may monitor the actual input voltage of the power system. The monitoring apparatus obtains the actual input voltage of the power system, and may send the actual input voltage of the power system to the rectifier, so that the rectifier obtains the actual input voltage of the power system.

In a first manner, the rectifier may determine, based on the bus voltage of the power system, whether the power system is in the undervoltage state. If the bus voltage is less than or equal to a first undervoltage threshold, the rectifier may determine that the power system is in the undervoltage state. For example, the first undervoltage threshold may be 300 V. It should be understood that different types of rectifiers may set different first undervoltage thresholds. In a second manner, the rectifier may determine, based on the actual input voltage of the power system, whether the power system is in the undervoltage state. If the actual input voltage is less than or equal to a second undervoltage threshold, the rectifier determines that the power system is in the undervoltage state. For example, the second undervoltage threshold may be 70 V. It should be understood that different types of power systems may set different second undervoltage thresholds. In a third manner, the rectifier may determine, based on the bus voltage of the power system and the actual input voltage of the power system, whether the power system is in the undervoltage state. If the bus voltage is less than or equal to the first undervoltage threshold, and the actual input voltage is less than or equal to the second undervoltage threshold, the rectifier determines that the power system is in the undervoltage state. It should be understood that the three manners are described as examples in this embodiment of this application. The first undervoltage threshold and the second undervoltage threshold in this embodiment of this application may be preset, and the rectifier may store the first undervoltage threshold and the second undervoltage threshold.

Because the power grid outputs varying voltages, the bus voltage of the power system and the actual input voltage of the power system may change. Therefore, in this embodiment of this application, if the power system is in the undervoltage state at a time, it may be inaccurate to determine that the current power grid is a weak power grid. For example, if the voltage output by the power grid abruptly decreases sharply but immediately rises, at this moment, the rectifier determines that the current power grid is a weak power grid, an output current adjusted by the power system may be limited. Therefore, in this embodiment of this application, to improve accuracy of determining whether the current power grid is a weak power grid by the rectifier, the following implementation may be used: If a quantity of times that the power system is in the undervoltage state within a preset time period is greater than or equal to a preset quantity of times, the rectifier determines that the current power grid is a weak power grid. For example, the preset quantity of times may be nine, and the preset time period may be three minutes. If the power system is in the undervoltage state for nine or more times within three minutes, the rectifier determines that the current power grid is a weak power grid.

In S302, if the current power grid is a weak power grid, the rectifier may determine that a voltage of the current power grid may cause repeated restart of the power system. In this embodiment of this application, the rectifier may adjust a current limit value of the power system based on the actual input voltage of the power system, so as to avoid an undervoltage phenomenon caused by insufficient power supply of the power system to the load. The current limit value may be understood as a maximum current value that can be output by the power system. In this embodiment of this application, the rectifier may determine the target current limit value based on the actual input voltage of the power system so that the rectifier adjusts the current limit value of the power system to the target current limit value. When working at the target current limit value, the power system may supply power to the load and the power system does not restart due to undervoltage.

In an implementation, the rectifier may store a correspondence between an actual input voltage and a target current limit value, and the correspondence may be obtained by tests based on the scenario shown in FIG. 1. It should be understood that a target current limit value corresponding to an actual input voltage may be: a maximum current capable of maintaining, when a load is determined, that the actual input voltage changes within a preset range. For example, the actual input voltage is 150 V, and the preset range is 140 V to 160 V. If the rectifier adjusts the current limit value so that the actual input voltage may change in the preset range 140 V to 160 V, a current limit value obtained after adjustment by the rectifier may be used as the target current limit value. After determining the actual input voltage, the rectifier may determine the target current limit value based on the correspondence between an actual input voltage and a target current limit value.

It should be understood that, in this embodiment of this application, a manner in which the correspondence is obtained by tests based on the scenario shown in FIG. 1 may be as follows. When the load and the actual input voltage are determined, the rectifier may change the current limit value to record a change of the actual input voltage, and further, use a maximum current limit value in current limit values as the target current limit value. In this manner, target current limit values corresponding to different actual input voltages may be obtained.

It should be noted that in this implementation, the rectifier may store a correspondence among an actual input voltage, a target current limit value, and a load. When actual input voltages are the same but loads are different, different target current limit values impose different impacts on the actual input voltages. Therefore, in this embodiment of this application, the rectifier may store the correspondence among an actual input voltage, a target current limit value, and a load. The correspondence may also be obtained by tests based on the scenario shown in FIG. 1. For example, when the load and the actual input voltage are determined, the rectifier may change the current limit value to record a change of the actual input voltage, and further, use a maximum current limit value in current limit values as the target current limit value. In this manner, target current limit values corresponding to different loads and different actual input voltages may be obtained. In this manner, after determining the actual input voltage, the rectifier may determine the target current limit value based on the correspondence among an actual input voltage, a target current limit value, and a load. It should be noted that in this embodiment of this application, the rectifier may use a load in a working state as a parameter for calculating the target current limit value.

In another implementation, the rectifier may obtain the target current limit value based on the actual input voltage and the load of the power system. In this embodiment of this application, a power supply for a main load in the load needs to be ensured to avoid repeated restart of the power system when the power system is a weak power grid. The rectifier may obtain the target current limit value based on the actual input voltage and the main load in the load. It should be understood that the main load in this embodiment of this application is preset. When determining the load in the working state, the rectifier may determine the main load in the load in the working state, so that the rectifier can use a current required by the main load as the target current limit value.

In S303, after obtaining the target current limit value, the rectifier may adjust the current limit value of the power system to the target current limit value so as to supply power to the load based on the target current limit value. It should be understood that after adjusting the current limit value of the power system to the target current limit value, the rectifier may adjust the output current based on the actual input voltage to ensure that the output current is not higher than the target current limit value. It should be understood that for a manner in which the rectifier supplies power to the load based on the target current limit value in this embodiment of this application, refer to related descriptions in an existing technical solution. Details are not described herein.

This embodiment of this application provides a power supply method. The method includes: determining whether the current power grid is a weak power grid; if the current power grid is a weak power grid, determining the target current limit value based on the actual input voltage of the power system; and supplying power to the load based on the target current limit value. In this embodiment of this application, the power system may adaptively adjust the current limit value of the power system based on the input voltage so as to supply power to the load while avoiding undervoltage in the power system. For example, when the input voltage is high the current limit value of the power system may be adjusted to a large value so that the power system can output a strong output current, thereby ensuring that the load is efficiently charged. When the input voltage is low, the current limit value of the power system is adjusted to a small value so that the power system can output a weak output current, thereby ensuring that power is supplied to the load while undervoltage is avoided in the power system.

In the description of the foregoing embodiment, the rectifier may obtain the target current limit value based on a pre-stored correspondence (for example, the correspondence between an actual input voltage and a target current limit value, or the correspondence among an actual input voltage, a target current limit value, and a load). In the foregoing manner, the preset correspondence is obtained in the test scenario. In an actual application process, the correspondence may not match an actual application due to use duration of a component in the power system (or another factor). Further, in the description of the foregoing embodiment, the rectifier may obtain the target current limit value based on the actual input voltage and the main load in the load. However, although repeated restart of the power system in a weak power grid can be avoided, it cannot be ensured that power is supplied to all the loads. Therefore, to resolve these two problems, in a power supply method provided in an embodiment of this application based on the foregoing embodiment, a rectifier may determine, based on an actual input voltage, a target current limit value in a process of adjusting a current limit value so that the power supply method is more applicable to an actual application scenario, and power supply is ensured for each load.

Figure 4:
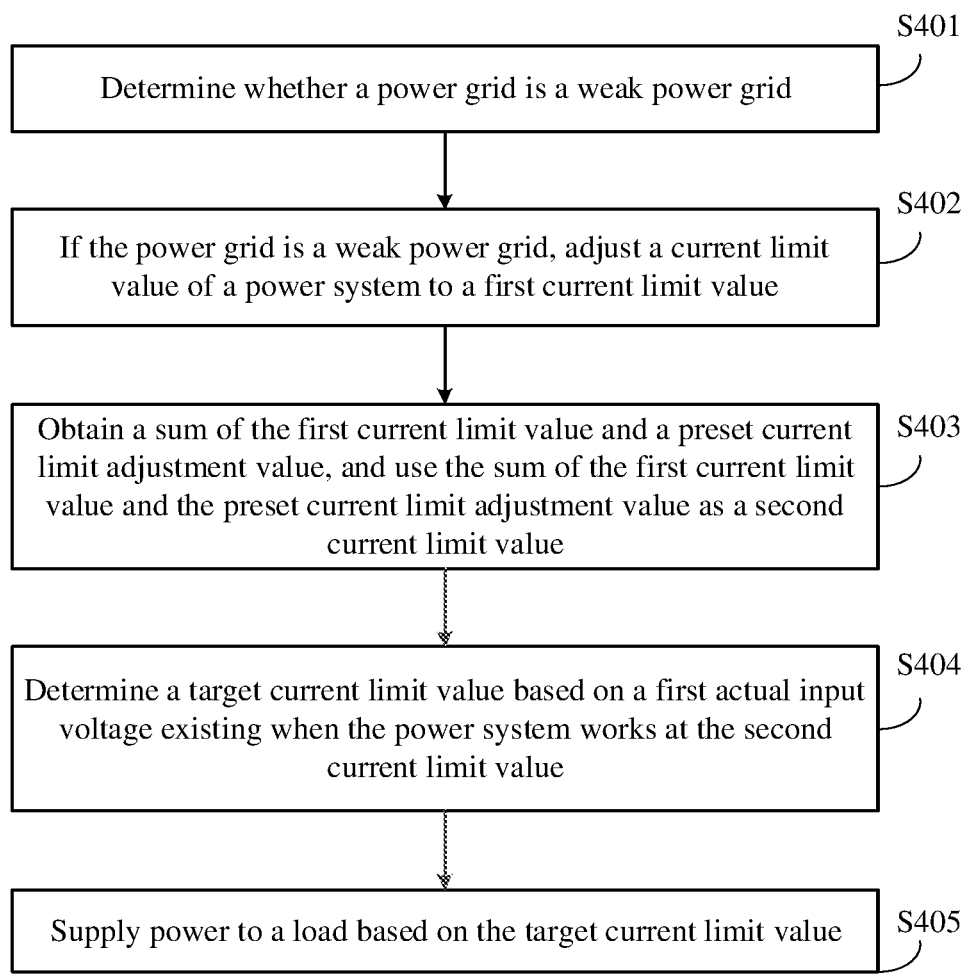
FIG. 4 is a flowchart of another power supply method according to an embodiment of this application.

FIG. 4 is a flowchart of another power supply method according to an embodiment of this application. As shown in FIG. 4, the power supply method provided in this embodiment of this application may include:

S401: Determine whether a current power grid is a weak power grid.

S402: If the current power grid is a weak power grid, adjust a current limit value of a power system to a first current limit value.

S403: Obtain a sum of the first current limit value and a preset current limit adjustment value, and use the sum of the first current limit value and the preset current limit adjustment value as a second current limit value.

S404: Determine a target current limit value based on a first actual input voltage existing when the power system works at the second current limit value.

S405: Supply power to a load based on the target current limit value.

For S401 and S405 in this embodiment of this application, refer to related descriptions of S301 and S303 in the foregoing embodiment. Details are not described herein.

In S402, in this embodiment of this application, if the current power grid is a weak power grid, the rectifier may continually adjust the current limit value of the power system so that the current limit value of the power system reaches a proper current limit value (that is, the target current limit value). In a process of adjusting the current limit value of the power system, the rectifier may first adjust the current limit value of the power system to the first current limit value. It should be understood that the first current limit value may be a minimum current limit value supported by the power system, and the minimum current limit value may be predefined. For example, the first current limit value of the power system may be 1 A. Optionally, the first current limit value may be related to attributes of the power system, and the attributes of the power system may include a rectifier type, a battery type, a capacity, and the like.

In S403, it should be noted that the preset current limit adjustment value may be preset in this embodiment of this application. The preset current limit adjustment value may be a value by which the rectifier increases or decreases the current limit value based on an adjusted current limit value of the power system. After the rectifier adjusts the current limit value of the power system to the first current limit value, the current limit value may be gradually increased. The rectifier may obtain the sum of the first current limit value and the preset current limit adjustment value, use the sum of the first current limit value and the preset current limit adjustment value as the second current limit value, and adjust the current limit value of the power system to the second current limit value.

For example, if the preset current limit adjustment value is 0.5 A, the rectifier may obtain, on the basis that the first current limit value is 1 A, the sum of the first current limit value and the preset current limit adjustment value, that is, 1.5 A, and use 1.5 A as the second current limit value. The rectifier may adjust the current limit value of the power system to 1.5 A.

In S404, in this embodiment of this application, after adjusting the first current limit value to the second current limit value, the rectifier may determine, based on an actual input voltage of the power system, whether to re-adjust the second current limit value of the power system. In this embodiment of this application, the rectifier may determine, based on a preset range and an actual input voltage of the power system that exists after adjustment from the first current limit value to the second current limit value, whether to re-adjust the second current limit value of the power system. In this embodiment of this application, the preset range of the actual input voltage may be preset. When the actual input voltage of the power system is within the preset range, it may be determined that the power system does not repeatedly restart and the current limit value of the power system is not re-adjusted. When the actual input voltage of the power system is within the preset range, the current limit value of the power system may be re-adjusted.

If an actual input voltage existing when the power system works at the second current limit value is greater than a first voltage threshold, the rectifier may determine that the second current limit value is small and may increase the second current limit value. It should be understood that the first voltage threshold may be an upper limit (or an upper boundary) of the preset range of the actual input voltage. In this embodiment of this application, the rectifier may obtain a sum of the second current limit value and the preset current limit adjustment value, and use the sum of the second current limit value and the preset current limit adjustment value as a third current limit value, so as to adjust the current limit value of the power system to the third current limit value. Similar to this step, if an actual input voltage existing when the power system works at the third current limit value is greater than the first voltage threshold, the rectifier may continue to adjust the third current limit value. For an adjustment manner, refer to the foregoing adjustment manner for the second current limit value.

If the actual input voltage existing when the power system works at the second current limit value is less than a second voltage threshold, the rectifier may determine that the second current limit value is large and the second current limit value needs to be decreased. It should be understood that the second voltage threshold may be a lower limit (or a lower boundary) of the preset range of the actual input voltage. That is, in this embodiment of this application, the second voltage threshold is less than the first voltage threshold. In this embodiment of this application, the rectifier may obtain a difference between the second current limit value and the preset current limit adjustment value and use the difference between the second current limit value and the preset current limit adjustment value as the third current limit value so as to adjust the current limit value of the power system to the third current limit value.

It should be understood that, when adjusting the current limit value of the power system, the rectifier may adjust the current limit value to the second current limit value (or the third current limit value) within a preset duration so as to avoid excessively fast adjustment of the current limit value from affecting stability of the power system. For example, the preset duration may be 5 s and the rectifier may adjust the current limit value of the power system from 1 A to 1.5 A within 5 s.

If the actual input voltage existing when the power system works at the second current limit value is greater than or equal to the second voltage threshold, and is less than or equal to the first voltage threshold, it may be determined that the actual input voltage of the power system is within the preset range and the current limit value of the power system is not re-adjusted. In this embodiment of this application, the second current limit value may be used as the target current limit value.

It should be noted that in this embodiment of this application, after adjusting the current limit value to the second current limit value (or the third current limit value) within the preset duration, the rectifier may wait for a preset duration and then obtain the actual input voltage of the power system, and use the actual input voltage as the actual input voltage existing when the power system works at the second current limit value (or the third current limit value). After the rectifier adjusts the current limit value of the power system, the actual input voltage of the power system may change in a short time. In this embodiment of this application, to obtain a stable and accurate actual input voltage, the actual input voltage of the power system may be obtained after waiting for the preset duration. For example, after the rectifier adjusts the current limit value of the power system from 1 A to 1.5 A within 5 s, and the actual input voltage of the power system becomes 155 V after waiting for 2 s, 155 V may be used as the actual input voltage existing when the power system works at the second current limit value (or the third current limit value).

In other words, in this embodiment of this application, that the rectifier determines the target current limit value based on the first actual input voltage existing when the power system works at the second current limit value may be considered as an iteration process. The iteration process may be shown in the following steps.

A. If an actual input voltage of the power system in an iteration period t is greater than or equal to the second voltage threshold and the actual input voltage in the iteration period t is less than or equal to the first voltage threshold, using a current limit value in the iteration period t as the target current limit value; or otherwise, performing B or C, where the first voltage threshold is greater than the second voltage threshold when t is equal to 1, the actual input voltage in the iteration period t is the first actual input voltage, and t is an integer greater than or equal to 1; and B. If the actual input voltage in the iteration period t is greater than the first voltage threshold, obtaining a sum of the current limit value in the iteration period t and the preset current limit adjustment value and using the sum of the current limit value in the iteration period t and the preset current limit adjustment value as a current limit value in a next iteration period; or C. If the actual input voltage in the iteration period t is less than the second voltage threshold, obtaining a difference between the current limit value in the iteration period t and the preset current limit adjustment value and using the difference between the current limit value in the iteration period t and the preset current limit adjustment value as a current limit value in a next iteration period; and D. Obtaining an actual input voltage existing when the power system works at the current limit value in the next iteration period, entering the next iteration period, and returning to A.

The variable t is an integer greater than or equal to 1. In step A, when t is 1, an actual input voltage in an iteration period 1 is the first actual input voltage. If the first actual input voltage is greater than or equal to the second voltage threshold, and the first actual input voltage is less than or equal to the first voltage threshold, the second current limit value may be used as the target current limit value. If the first actual input voltage is greater than the first voltage threshold, step B may be performed. Alternatively, if the first actual input voltage is less than the second voltage threshold, step C may be performed.

In step B, if the first actual input voltage is greater than the first voltage threshold, a sum of a current limit value (the second current limit value) in the iteration period 1 and the preset current limit adjustment value may be obtained and the sum of the second current limit value and the preset current limit adjustment value is used as the current limit value of the next iteration period, for example, the third current limit value.

In step C, if the first actual input voltage is less than the second voltage threshold, a difference between the current limit value (the second current limit value) in the iteration period 1 and the preset current limit adjustment value is obtained, and the difference between the second current limit value and the preset current limit adjustment value is used as the current limit value of the next iteration period, for example, the third current limit value.

In step D, the rectifier may obtain the actual input voltage (for example, a second input voltage) existing when the power system works at the third current limit value, enter the next iteration period, and return to perform A. Returning to A means determining a magnitude relationship between the second input voltage and each of the first voltage threshold and the second voltage threshold and further performing step A, step B, or step C.

The following describes a process in which the rectifier adjusts the current limit value of the power system. For example, the preset range of the actual input voltage may be 150 V to 160 V, the first voltage threshold may be 160 V, and the second voltage threshold may be 150 V. The rectifier may first adjust the current limit value of the power system to the first current limit value, for example, 1 A. After adjusting the current limit value of the power system to 1 A, the rectifier may adjust the current limit value of the power system from 1 A to 1.5 A within 5 s, where 1.5 A is the second current limit value. An actual input voltage of the power system is obtained after waiting for 2 s. If the actual input voltage is greater than 160 V, the rectifier may continue to adjust the current limit value of the power system from 1.5 A to 2 A within 5 s, where 2 A is the third current limit value, and then wait for 2 s to obtain an actual input voltage of the power system. If the actual input voltage is still greater than 160 V, the rectifier may continue to adjust the current limit value of the power system. On the contrary, if an input voltage of the power system obtained after the current limit value is adjusted is less than 150 V, the current limit adjustment value may be decreased in the manner in step C so as to perform dynamic adjustment.

If the rectifier adjusts the current limit value of the power system from 1.5 A to 2 A within 5 s, and waits for 2 s to obtain an actual input voltage of the power system, which is less than 150 V, the rectifier may adjust the current limit value of the power system from 2 A to 1.5 A within 5 s, and wait for 2 s to obtain an actual input voltage of the power system. If the actual input voltage is within the preset range of 150 V to 160 V, 1.5 A may be used as the target current limit value. That is, as the power system performs an increase from the first current limit value, the actual input voltage tends to increase first and then decrease. In the foregoing embodiment, a current limit value existing when the actual input voltage reaches a maximum value may be used as the target current limit value.

In this embodiment of this application, the rectifier may dynamically adjust the current limit value of the power system based on the actual input voltage so as to adjust the current limit value to the target current limit value. This method is more applicable to an actual application scenario. With this method, the load is sufficiently charged based on a real-time actual input voltage, thereby maximizing a capability of utilizing the power grid and improving charging efficiency.

As shown in FIG. 1, the power system in this embodiment of this application may include a battery. When the power system is in the undervoltage state, the battery may discharge to the load. Therefore, the battery may provide a part of a load current to charge the load. When the power system includes a battery, if the power system starts a technical solution of automatically adjusting the current limit value in the foregoing embodiment, after the current limit value decreases, a current provided by the power system for charging the battery decreases. This mainly ensures a current for the load, to ensure power supply stability of the power system. In addition, the battery is charged with a weak current, so that the battery can be normally charged at a charging speed lower than that existing when the current limit value is not limited. In this way, the power system does not crash (restart repeatedly). If the power system does not limit the current limit value, a current provided by the power system for charging the battery increases. In this case, a load current (a current for charging the battery and the load) of the power system exceeds a capability of the power grid. As a result, the power system encounters undervoltage and repeatedly restarts, no stable power supply is provided to the load, and the battery cannot be charged. After a long time, the battery may be damaged due to long-time undervoltage and cannot be reused.

In this case, as the power system performs an increase from a minimum current limit value, the actual input voltage may tend to increase first and then decrease. In the description of the foregoing embodiment, the current limit value existing when the actual input voltage reaches the maximum value is used as the target current limit value. If an actual input voltage of the power system is very low (for example, 150 V) when the rectifier starts to adjust the current limit value of the power system, if the current limit value of the power system is continuously increased, the actual input voltage of the power system may continuously decrease, causing undervoltage in the power system. In other words, when an input voltage is very low, a range of the current limit value that can be adjusted by the power system is limited. Therefore, in this embodiment of this application, to ensure accuracy of adjusting the current limit value by the power system, when the actual input voltage is within a proper voltage range, the rectifier can increase or decrease the current limit value of the power system without causing undervoltage in the power system and can further adjust the current limit value of the power system to the target current limit value. This method can improve stability of the power system and stability of the power supply method.

Figure 5:
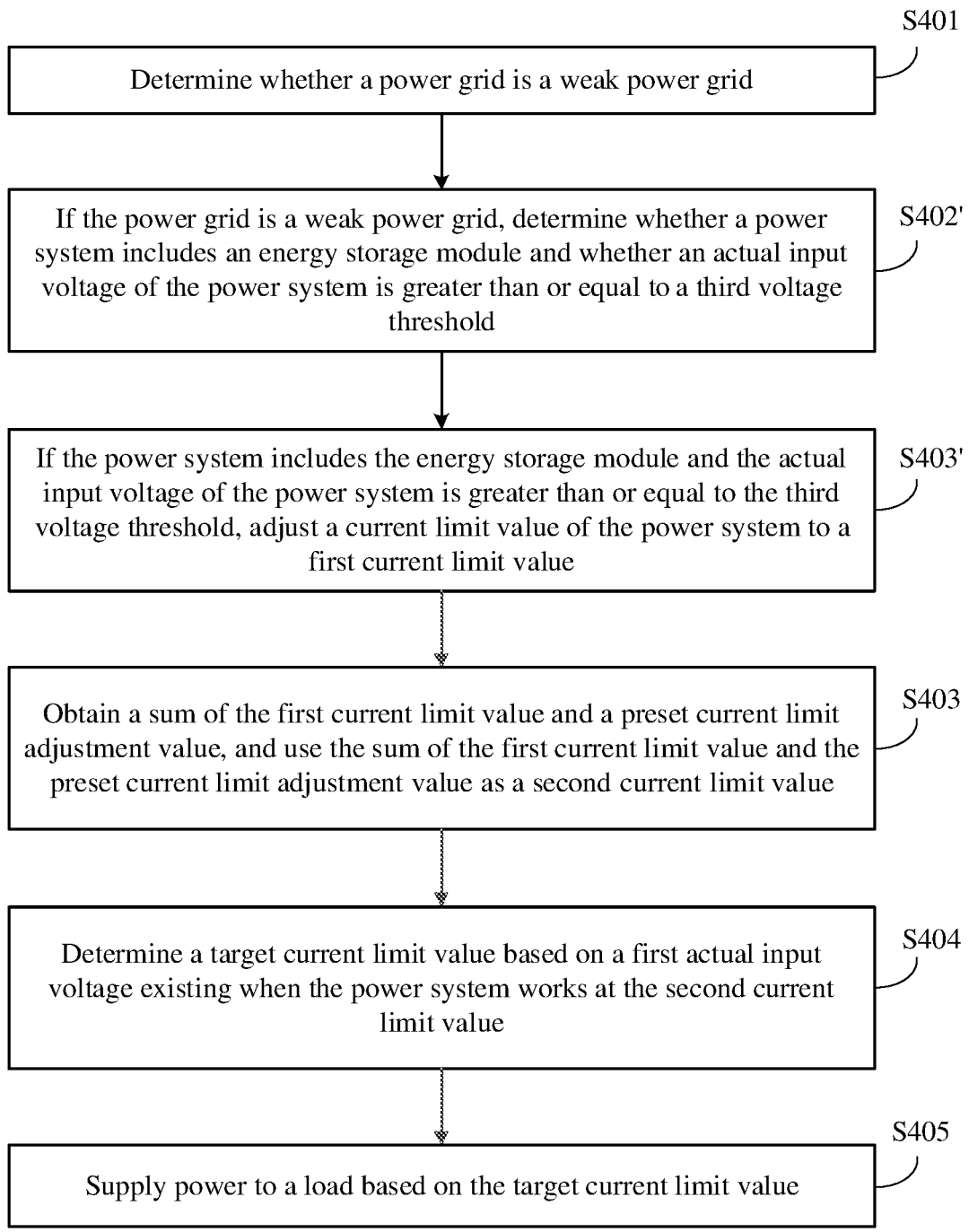
FIG. 5 is a flowchart of another power supply method according to an embodiment of this application.

FIG. 5 is a flowchart of another power supply method according to an embodiment of this application. As shown in FIG. 5, in this embodiment of this application, S402 may be replaced with S402' and S403'.

S402': If the current power grid is a weak power grid, determine whether a power system includes an energy storage module and whether an actual input voltage of the power system is greater than or equal to a third voltage threshold.

S403': If the power system includes the energy storage module, and the actual input voltage of the power system is greater than or equal to the third voltage threshold, adjust a current limit value of the power system to a first current limit value.

In S402', the energy storage module of the power system may be the battery in FIG. 1 or another energy storage element, such as a capacitor. This is not limited in this embodiment of this application. The monitoring apparatus in the foregoing embodiment may monitor a working status of each component in the power system. The monitoring apparatus may also monitor whether the power system includes the energy storage module. In this embodiment of this application, the rectifier may interact with the monitoring apparatus to determine whether the power system includes the energy storage module. For example, the rectifier may read, in the monitoring apparatus, a status of the energy storage module. If the status of the energy storage module is a connected state, it is determined that the power system includes the energy storage module. In addition, in this embodiment of this application, it is further determined whether the actual input voltage is greater than or equal to the third voltage threshold. The third voltage threshold may be a specified empirical value, for example, 170 V.

In S403', if the power system includes the energy storage module and the actual input voltage of the power system is greater than or equal to the third voltage threshold, in this embodiment of this application the rectifier performs an action of adjusting the current limit value of the power system in the foregoing embodiment. It should be understood that for "adjust a current limit value of the power system to a first current limit value" in S403', refer to a related description of S402 in the foregoing embodiment.

It should be understood that in this embodiment of this application, when the power system includes the energy storage module, a purpose of further making the actual input voltage greater than or equal to the third voltage threshold is to avoid undervoltage in the power system in a process in which the rectifier adjusts the current limit value of the power system, thereby ensuring power supply stability of the power system.

Figure 6:
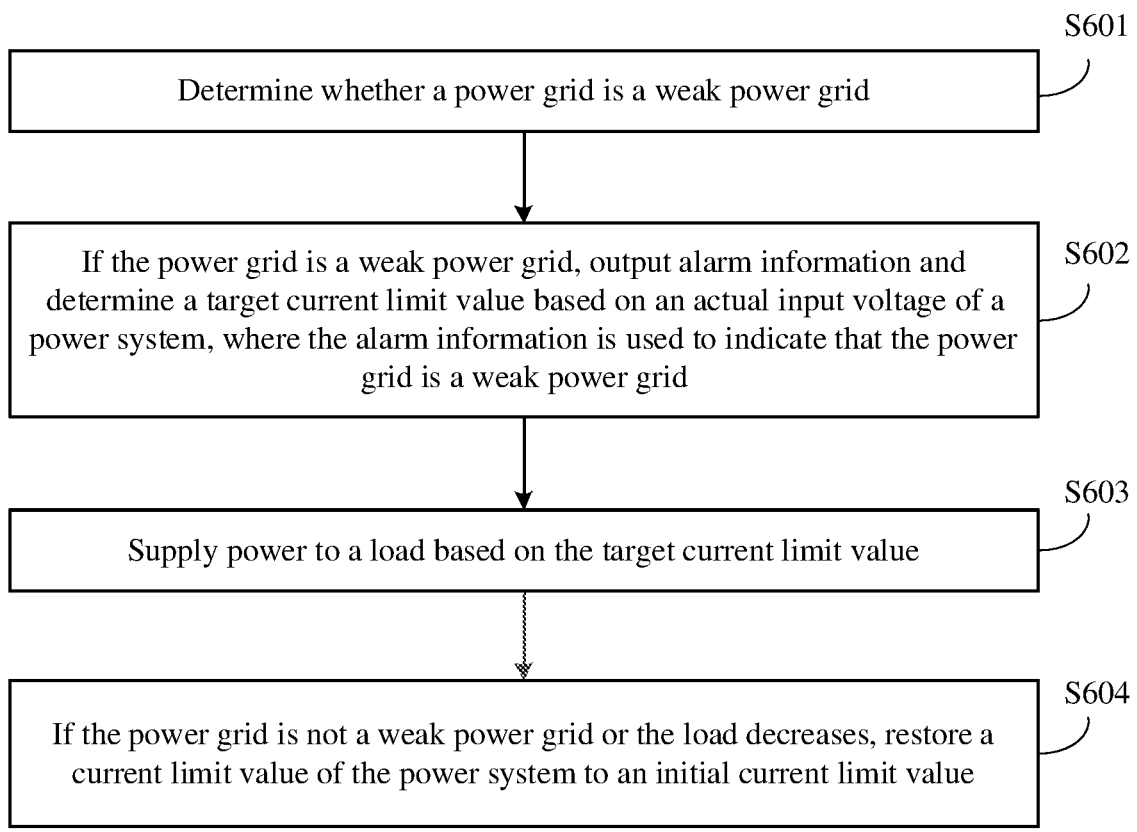
FIG. 6 is a flowchart of another power supply method according to an embodiment of this application.

Based on the foregoing embodiments, FIG. 6 is a flowchart of another power supply method according to an embodiment of this application. As shown in FIG. 6, the power supply method provided in this embodiment of this application may include the following.

S601: Determine whether a current power grid is a weak power grid.

S602: If the current power grid is a weak power grid, output alarm information, and determine a target current limit value based on an actual input voltage of a power system, where the alarm information indicates that the current power grid is a weak power grid.

S603: Supply power to a load based on the target current limit value.

S604: If the current power grid is not a weak power grid or the load decreases, adjust a current limit value of the power system to an initial current limit value.

For implementations of S601 and S603 in this embodiment of this application, refer to related descriptions of S301 and S303 in the foregoing embodiment. Details are not described herein.

In S602, if the current power grid is a weak power grid, the rectifier may output the alarm information. The alarm information indicates that the current power grid is a weak power grid. In this embodiment of this application, one or more of a display module, an alarm indicator, or a buzzer may be disposed on the rectifier. A manner of inputting the alarm information by the rectifier may be as follows: The rectifier controls the display module to display text information, for example, "weak power grid". Alternatively, the rectifier may turn on the alarm indicator, or the rectifier may control the buzzer to turn on and produce a buzzing sound. Alternatively, in this embodiment of this application, the rectifier may further send the alarm information to a terminal device of a user by using a communication module. A manner of outputting the alarm information is not limited in this embodiment of this application, and the display module, the alarm indicator, or the buzzer is used as an example for description.

In S604, if the current power grid is not a weak power grid, the rectifier may adjust the current limit value of the power system to the initial current limit value. The initial current limit value may be understood as a current limit value of the power system existing before the rectifier adjusts the current limit value. It should be understood that, a manner in which the rectifier determines that the current power grid is not a weak power grid may be as follows. If a quantity of times that the power system is in an undervoltage state within a preset time period is less than a preset quantity of times, it is determined that the current power grid is not a weak power grid. Alternatively, if the actual input voltage is greater than or equal to a second undervoltage threshold, it is determined that the current power grid is not a weak power grid. It should be understood that the second undervoltage threshold may be understood as a voltage required for normal working of the power system, for example, 220 V, or another preset voltage value.

Alternatively, when an actual output current is less than the target current limit value, that is, the load of the power system decreases, there is no need to limit the current limit value of the power system, and no undervoltage occurs in the power system. If the actual output current is less than the target current limit value, it is determined that the current power grid is not a weak power grid. In this embodiment of this application, when the current power grid is not a weak power grid, a purpose of adjusting the current limit value of the power system by the rectifier to the initial current limit value is to enable the power system to charge the load at a maximum charging voltage (that is, an output voltage of the power system).

It should be understood that, in this embodiment of this application, when the power grid is not a weak power grid within preset duration, the rectifier may adjust the current limit value of the power system to the initial current limit value. For example, if an actual input voltage within the preset duration is greater than or equal to the second undervoltage threshold, it is determined that the current power grid is not a weak power grid, or when an actual output current within the preset duration is less than the target current limit value, it is determined that the current power grid is not a weak power grid. A purpose of such practice aims to avoid misjudgment of the rectifier caused by a sudden voltage change of the power grid, thereby improving accuracy and stability of the power supply method.

In this embodiment of this application, when the rectifier adjusts the current limit value of the power system to the initial current limit value, the method may further include canceling the alarm information to indicate that the current power grid is not a weak power grid. For example, the text information, for example, "weak power grid" is not displayed. Alternatively, the rectifier turns off the alarm indicator or the rectifier turns off the buzzer.

In this embodiment of this application, the alarm information may be output when the power grid is a weak power grid, so as to remind that the current power grid is a weak power grid. In addition, the rectifier may further adjust the current limit value of the power system to the initial current limit value when the current power grid is not a weak power grid, so that the power system can charge the load at the maximum charging voltage, thereby improving intelligence of the power system.

Figure 7A:
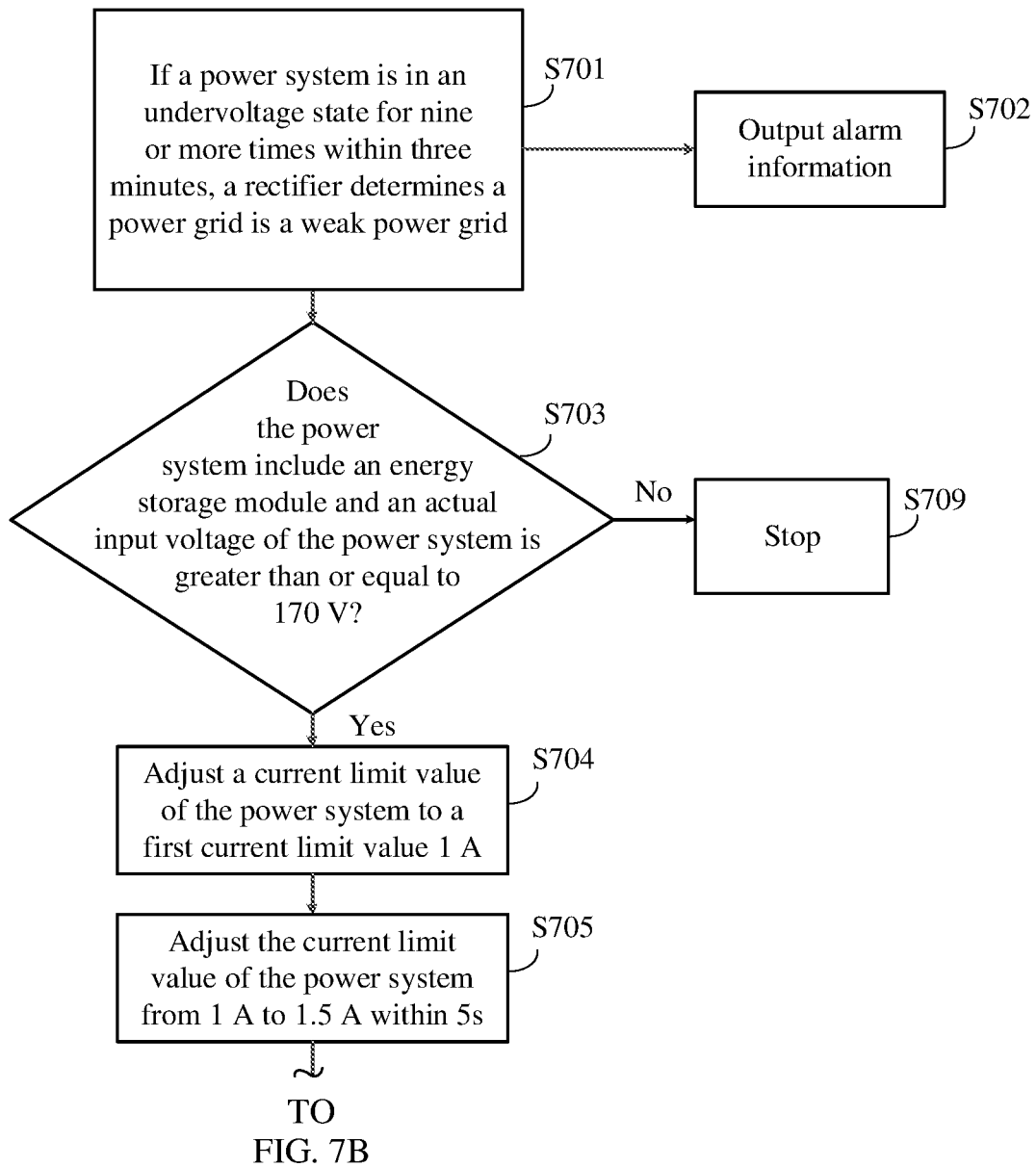
FIG. 7A and FIG. 7B are a flowchart of a power supply method according to an embodiment of this application.
Figure 7B:
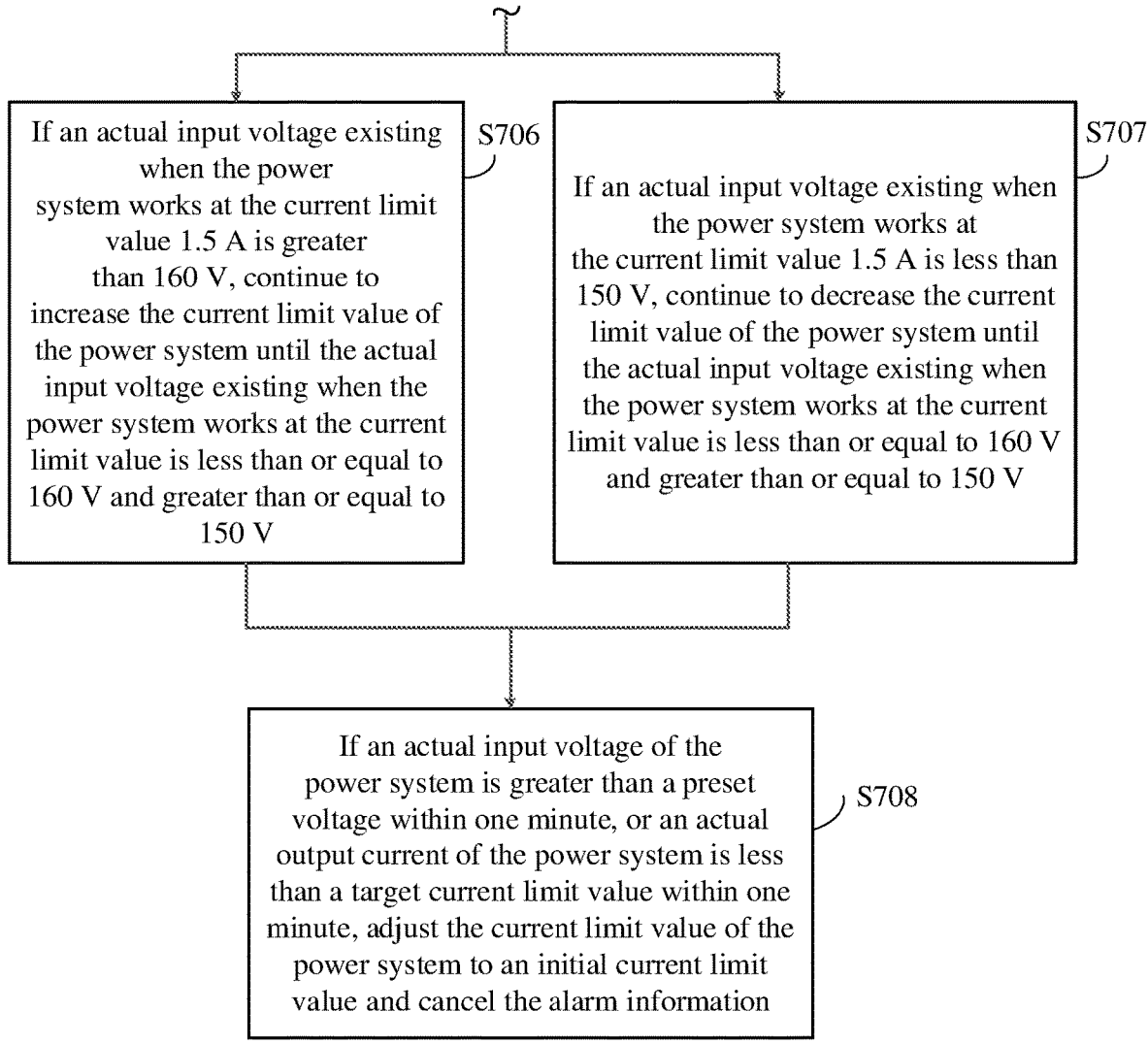

In the following embodiments, an operation process in an actual application process is used to describe the power supply method in embodiments of this application. FIG. 7A and FIG. 7B are a flowchart of another power supply method according to an embodiment of this application. As shown in FIG. 7A and FIG. 7B, the power supply method provided in this embodiment of this application may include:

S701: If a power system is in an undervoltage state for nine or more times within three minutes, a rectifier determines that a current power grid is a weak power grid.

S702: Output alarm information.

S703: Determine whether the power system includes an energy storage module, and whether an actual input voltage of the power system is greater than or equal to 170 V. If yes, S704 is performed, or if no, S709 is performed.

S704: Adjust a current limit value of the power system to a first current limit value 1 A.

S705: Adjust the current limit value of the power system from 1 A to 1.5 A within 5 s.

S706: If an actual input voltage existing when the power system works at the current limit value 1.5 A is greater than 160 V, continue to increase the current limit value of the power system until the actual input voltage existing when the power system works at the current limit value is less than or equal to 160 V and greater than or equal to 150 V.

S707: If an actual input voltage existing when the power system works at the current limit value 1.5 A is less than 150 V, continue to decrease the current limit value of the power system until the actual input voltage existing when the power system works at the current limit value is less than or equal to 160 V and greater than or equal to 150 V.

S708: If an actual input voltage of the power system is greater than a preset voltage within one minute, or an actual output current of the power system is less than a target current limit value within one minute, adjust the current limit value of the power system to an initial current limit value and cancel the alarm information.

S709: Stop.

It should be understood that S702 and S703 may be performed simultaneously and there may be no sequence between S702 and S703. S706 and S707 may also be performed simultaneously.

In S703 in this embodiment of this application, if the power system includes the energy storage module, and the actual input voltage of the power system is greater than or equal to 170 V, the rectifier performs an action of adjusting the current limit value of the power system in this embodiment of this application.

It should be noted that when the rectifier performs S706, if the actual input voltage existing when the power system works at the current limit value is less than 150 V, the step of S707 may be performed. Similarly, in S707, if the actual input voltage existing when the power system works at the current limit value is greater than 160 V, the step of S706 may be performed. In other words, in this embodiment of this application, if the actual input voltage existing when the power system works at the current limit value is less than 150 V, an operation of reducing the current limit value of the power system may be performed, or if the actual input voltage existing when the power system works at the current limit value is greater than 160 V, an operation of decreasing the current limit value of the power system may be performed, until the actual input voltage existing when the power system works at the current limit value is less than or equal to 160 V and greater than or equal to 150 V.

It should be understood that for technical effects of this embodiment of this application, refer to related descriptions in the foregoing embodiments.

Figure 8:
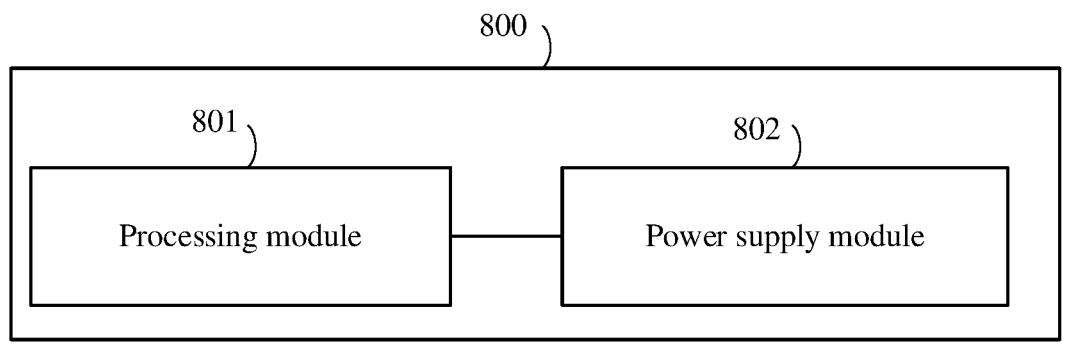
FIG. 8 is a diagram of a power supply apparatus according to an embodiment of this application.

FIG. 8 is a diagram of a power supply apparatus according to an embodiment of this application. The power supply apparatus in this embodiment may be the rectifier mentioned above, may be a chip applied to the rectifier, or may be a chip applied to a power system or another apparatus or module in the power system. The power supply apparatus may be configured to perform an action of the rectifier in the foregoing method embodiments. As shown in FIG. 8, the power supply apparatus may include a processing module 801 and a power supply module 802.

The processing module 801 is configured to: determine whether a current power grid is a weak power grid, and if the current power grid is a weak power grid, determine a target current limit value based on an actual input voltage of the power system.

The power supply module 802 is configured to supply power to a load based on the target current limit value.

In an implementation, the processing module 801 is configured to: if a quantity of times that the power system is in an undervoltage state within a preset time period is greater than or equal to a preset quantity of times, determine that the current power grid is a weak power grid.

In an implementation, the processing module 801 is further configured to determine, based on at least one of a bus voltage and the actual input voltage that are of the power system, whether the power system is in the undervoltage state.

In an implementation, the processing module 801 is configured to: if the bus voltage is less than or equal to a first undervoltage threshold, and/or the actual input voltage is less than or equal to a second undervoltage threshold, determine that the power system is in the undervoltage state.

In an implementation, the processing module 801 is configured to: adjust a current limit value of the power system to a first current limit value; obtain a sum of the first current limit value and a preset current limit adjustment value, use the sum of the first current limit value and the preset current limit adjustment value as a second current limit value; and determine the target current limit value based on a first actual input voltage existing when the power system works at the second current limit value.

In an implementation, the processing module 801 is configured to perform the following steps.

A. if an actual input voltage of the power system in an iteration period t is greater than or equal to a second voltage threshold and the actual input voltage in the iteration period t is less than or equal to a first voltage threshold, using a current limit value in the iteration period t as the target current limit value; or otherwise, performing B or C, where the first voltage threshold is greater than the second voltage threshold when t is equal to 1, the actual input voltage in the iteration period t is the first actual input voltage, and t is an integer greater than or equal to 1; and B. if the actual input voltage in the iteration period t is greater than the first voltage threshold, obtaining a sum of the current limit value in the iteration period t and the preset current limit adjustment value and using the sum of the current limit value in the iteration period t and the preset current limit adjustment value as a current limit value in a next iteration period; or C. if the actual input voltage in the iteration period t is less than the second voltage threshold, obtaining a difference between the current limit value in the iteration period t and the preset current limit adjustment value, and using the difference between the current limit value in the iteration period t and the preset current limit adjustment value as a current limit value in a next iteration period; and D. obtaining an actual input voltage existing when the power system works at the current limit value in the next iteration period, entering the next iteration period, and returning to A.

In an implementation, the processing module 801 is further configured to: if an actual output current of the power system is less than the target current limit value, adjust the current limit value of the power system to an initial current limit value.

In an implementation, the processing module 801 is further configured to: if the actual input voltage is greater than or equal to the second undervoltage threshold, adjust the current limit value of the power system to an initial current limit value.

In an implementation, the processing module 801 is configured to: determine whether the power system includes an energy storage module and whether the actual input voltage of the power system is greater than or equal to a third voltage threshold; and if the power system includes the energy storage module and the actual input voltage of the power system is greater than or equal to the third voltage threshold, determine the target current limit value based on the actual input voltage of the power system.

In an implementation, the processing module 801 is further configured to: if the current power grid is a weak power grid, output alarm information, where the alarm information indicates that the current power grid is a weak power grid.

The power supply apparatus provided in this embodiment of this application can perform an action of the rectifier in the foregoing method embodiments. Implementation principles and technical effects thereof are similar, and details are not described herein.

It should be noted that, it should be understood that the foregoing processing modules may be implemented in a form of software invoked by a processing element or may be implemented in a form of hardware. For example, the processing module may be a separately disposed processing element or may be integrated into a chip of the foregoing apparatus for implementation. In addition, the processing module may be stored in a memory of the foregoing apparatus in a form of program code and may be invoked by a processing element of the foregoing apparatus to perform a function of the processing module. In addition, all or some of these modules may be integrated together, or may be implemented independently. The processing element herein may be an integrated circuit and has a signal processing capability. In an implementation process, steps in the foregoing methods or the foregoing modules may be implemented by using a hardware integrated logical circuit in the processing element, or by using instructions in a form of software. For example, the foregoing modules may be configured as one or more integrated circuits for implementing the method, such as one or more application-specific integrated circuits (ASIC), one or more microprocessors, a digital signal processor (DSP), or one or more field programmable gate arrays (FPGA). For another example, when one of the foregoing modules is implemented in a form of invoking program code by a processing element, the processing element may be a general-purpose processor, for example, a central processing unit (CPU) or another processor that can invoke the program code. For another example, these modules may be integrated together and implemented in a form of a system-on-a-chip (SOC).

Figure 9:
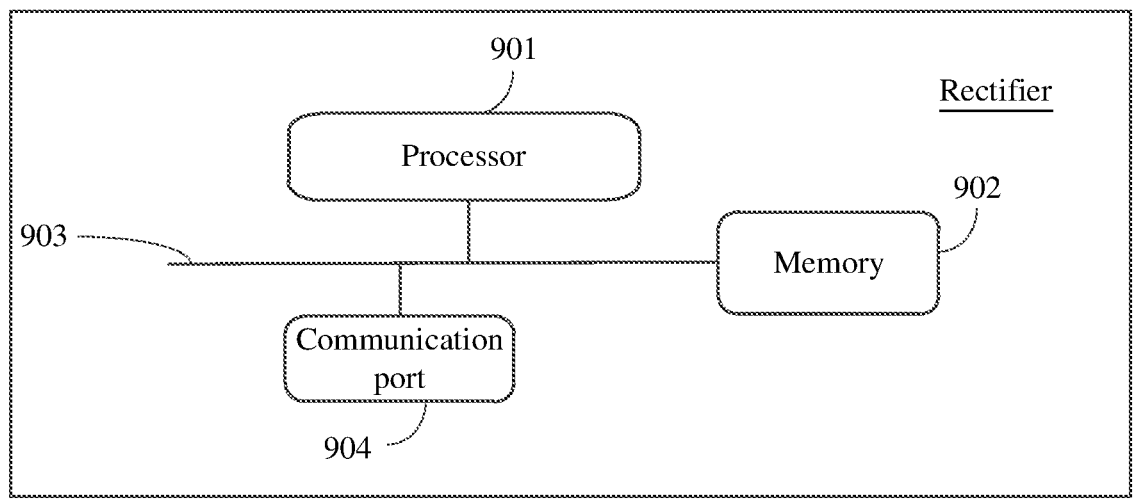
FIG. 9 is a diagram of another power supply apparatus according to an embodiment of this application.

FIG. 9 is a diagram of another power supply apparatus according to an embodiment of this application. As shown in FIG. 9, the power supply apparatus may be the rectifier in the foregoing embodiments and the power supply apparatus may include a processor 901 (for example, a CPU) and a memory 902. The memory 902 may include a high-speed random access memory (RAM), or may include a non-volatile memory (NVM), for example, at least one disk memory. The memory 902 may store various instructions to complete various processing functions and implement the method steps of this application. Optionally, the power supply apparatus in this application may further include a communication bus 903 and a communication port 904. The communication bus 903 is configured to implement a communication connection between elements. The communication port 904 is configured to implement connection and communication between the power supply apparatus and another peripheral. In this embodiment of this application, the memory 902 is configured to store computer executable program code, where the program code includes instructions. When the processor 901 executes the instructions, the instructions enable the processor 901 of the power supply apparatus to execute a processing action of the terminal device in the foregoing method embodiments. Implementation principles and technical effects thereof are similar, and details are not described herein.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state disk (SSD)), or the like.

An embodiment of this application further provides a power system. The power system includes the power supply apparatus (for example, the rectifier) and the monitoring apparatus described in the foregoing embodiments, and may further include a battery, another energy storage module, or the like. The power system may be the power system shown in FIG. 1 or FIG. 2.

An embodiment of this application provides a power supply system. The power supply system may include the power system described above, a power grid, a power transformer, and the like. The power grid may supply power to the power system by using the power transformer. The power supply system may be the power supply system shown in FIG. 1 or FIG. 2.

The term "a plurality of" in this specification indicates two or more. The term "and/or" in this specification describes only an association relationship for describing associated objects and indicates that there may be three relationships. For example, A and/or B may represent the following three cases: Only A exists, both A and B exist, and only B exists. In addition, the character "/" in this specification usually indicates an "or" relationship between the associated objects. In a formula, the character "/" indicates a "division" relationship between associated objects.

It may be understood that various numbers in embodiments of this application are merely used for ease of distinguishing, and are not used to limit the scope of embodiments of this application.

It should be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

What is claimed is:

1. A power supply method for a power system supplying power to a load from a power grid, the power supply method comprising:

determining the power grid is a weak power grid if a quantity of times the power system is in an undervoltage state within a preset time period is greater than or equal to a preset quantity of times;

determining a target current limit value based on an actual input voltage of the power system if the power grid is the weak power grid; and supplying power to the load based on the target current limit value.

2. The method according to claim 1, wherein the method further comprising:

determining, based on at least one of a bus voltage and the actual input voltage of the power system, whether the power system is in the undervoltage state.

3. The method according to claim 2, wherein the determining, based on the at least one of the bus voltage and the actual input voltage of the power system, whether the power system is in the undervoltage state comprising:

if the bus voltage is less than or equal to a first undervoltage threshold, and/or the actual input voltage is less than or equal to a second undervoltage threshold, determining the power system is in the undervoltage state.

4. The method according to claim 3, further comprising:

if the actual input voltage is greater than or equal to the second undervoltage threshold, adjusting the current limit value of the power system to an initial current limit value.

5. The method according to claim 1, wherein the determining the target current limit value based on the actual input voltage of the power system comprising:

adjusting a current limit value of the power system to a first current limit value;

obtaining a sum of the first current limit value and a preset current limit adjustment value, and using the sum as a second current limit value; and determining the target current limit value based on a first actual input voltage existing when the power system operates at the second current limit value.

6. The method according to claim 5, wherein the determining the target current limit value based on the first actual input voltage existing when the power system works at the second current limit value comprising:

A) if the actual input voltage of the power system in an iteration period t is greater than or equal to a second voltage threshold, and the actual input voltage in the iteration period t is less than or equal to a first voltage threshold, using a current limit value in the iteration period t as the target current limit value, otherwise, performing B or C, wherein the first voltage threshold is greater than the second voltage threshold when t is equal to 1, the actual input voltage in the iteration period t is the first actual input voltage, and t is an integer greater than or equal to 1; and B) if the actual input voltage in the iteration period t is greater than the first voltage threshold, obtaining a sum of the current limit value in the iteration period t and the preset current limit adjustment value, and using the sum as a next current limit value in a next iteration period; or C) if the actual input voltage in the iteration period t is less than the second voltage threshold, obtaining a difference between the current limit value in the iteration period t and the preset current limit adjustment value, and using the difference as the next current limit value in the next iteration period; and D) obtaining an actual input voltage existing when the power system operates at the current limit value in the next iteration period.

7. The method according to claim 1, further comprising:
if an actual output current of the power system is less than the target current limit value, adjusting the current limit value of the power system to an initial current limit value.

8. The method according to claim 1, before the determining the target current limit value based on the actual input voltage of the power system, the method further comprising:

determining whether the power system comprises an energy storage module and whether the actual input voltage of the power system is greater than or equal to a third voltage threshold; and the determining the target current limit value based on the actual input voltage of the power system comprises:

if the power system comprises the energy storage module, and the actual input voltage of the power system is greater than or equal to the third voltage threshold, determining the target current limit value based on the actual input voltage of the power system.

9. The method according to claim 1, further comprising:
if the power grid is the weak power grid, outputting alarm information, wherein the alarm information indicates that the power grid is a weak power grid.

10. A power supply apparatus for a power system supplying power to a load from a power grid, the power supply apparatus comprising:
a processing module configured to:
determine the power grid is a weak power grid if a quantity of times the power system is in an undervoltage state within a preset time period is greater than or equal to a preset quantity of times; and determine a target current limit value based on an actual input voltage of the power system if the power grid is the weak power grid; and a power supply module configured to supply power to the load based on the target current limit value.

11. The apparatus according to claim 10, wherein the processing module is further configured to determine, based on at least one of a bus voltage and the actual input voltage of the power system, whether the power system is in the undervoltage state.

12. The apparatus according to claim 11, wherein the processing module is configured to, if the bus voltage is less than or equal to a first undervoltage threshold, and/or the actual input voltage is less than or equal to a second undervoltage threshold, determine that the power system is in the undervoltage state.

13. The apparatus according to claim 10, wherein the processing module is configured to:
adjust a current limit value of the power system to a first current limit value;
obtain a sum of the first current limit value and a preset current limit adjustment value and use the sum as a second current limit value; and
determine the target current limit value based on a first actual input voltage existing when the power system operates at the second current limit value.

14. The apparatus according to claim 13, wherein the processing module is configured to:

A) if the actual input voltage of the power system in an iteration period t is greater than or equal to a second voltage threshold, and the actual input voltage in the iteration period t is less than or equal to a first voltage threshold, using a current limit value in the iteration period t as the target current limit value; otherwise, performing B or C, wherein the first voltage threshold is greater than the second voltage threshold when t is equal to 1, the actual input voltage in the iteration period t is the first actual input voltage, and t is an integer greater than or equal to 1; and B) if the actual input voltage in the iteration period t is greater than the first voltage threshold, obtaining a sum of the current limit value in the iteration period t and the preset current limit adjustment value, and using the sum as a next current limit value in a next iteration period; or C) if the actual input voltage in the iteration period t is less than the second voltage threshold, obtaining a difference between the current limit value in the iteration period t and the preset current limit adjustment value, and using the difference as the next current limit value in the next iteration period; and D) obtaining an actual input voltage existing when the power system operates at the current limit value in the next iteration period.

15. The apparatus according to claim 10, wherein the processing module is further configured to, if an actual output current of the power system is less than the target current limit value, adjust the current limit value of the power system to an initial current limit value.

16. The apparatus according to claim 10, wherein the processing module is further configured to, if the actual input voltage is greater than or equal to the second undervoltage threshold, adjust the current limit value of the power system to an initial current limit value.

17. The apparatus according to claim 10, wherein the processing module is further configured to:
- determine whether the power system comprises an energy storage module and whether the actual input voltage of the power system is greater than or equal to a third voltage threshold; and
- if the power system comprises the energy storage module and the actual input voltage of the power system is greater than or equal to the third voltage threshold, determine the target current limit value based on the actual input voltage of the power system.

18. A power system, comprising:
- a power supply apparatus disposed in a power system, the power system supplying power to a load from a power grid, the power supply apparatus comprising:
  - a processing module, configured to:
    - determine the power grid is a weak power grid if a quantity of times the power system is in an under-voltage state within a preset time period is greater than or equal to a preset quantity of times; and
    - determine a target current limit value based on an actual input voltage of the power system if the power grid is the weak power grid; and
  - a power supply module configured to supply power to the load based on the target current limit value; and
- a monitoring apparatus configured to monitor the power supply apparatus.

* * * * *